N. D. CHARD.
LATHE.
APPLICATION FILED SEPT. 22, 1909.

1,007,182.

Patented Oct. 31, 1911.

3 SHEETS—SHEET 1.

Witnesses
Oliver B. Kaiser
Emma Spener

Inventor
Nicholas D. Chard
By Wood & Wood
Attorneys

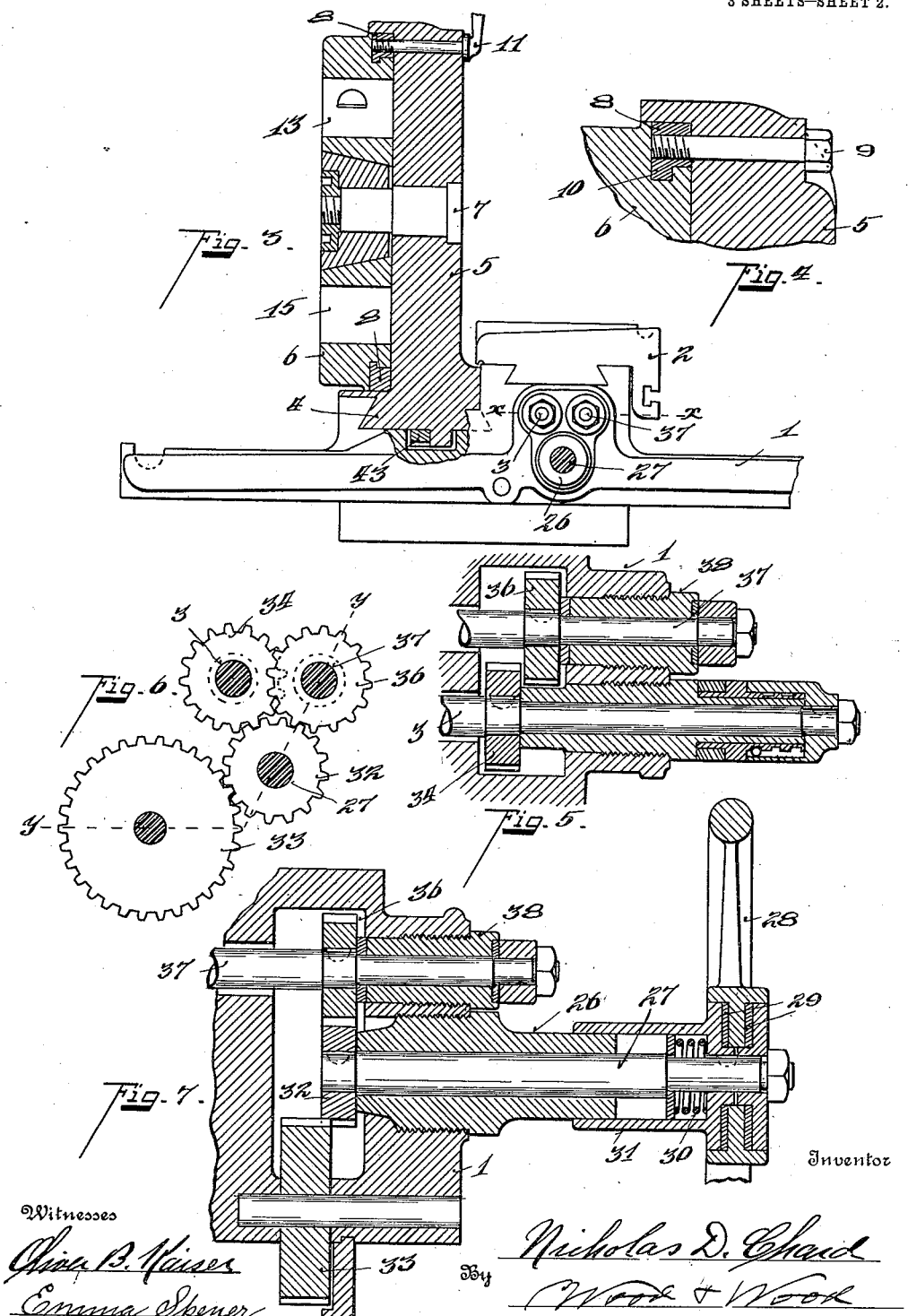

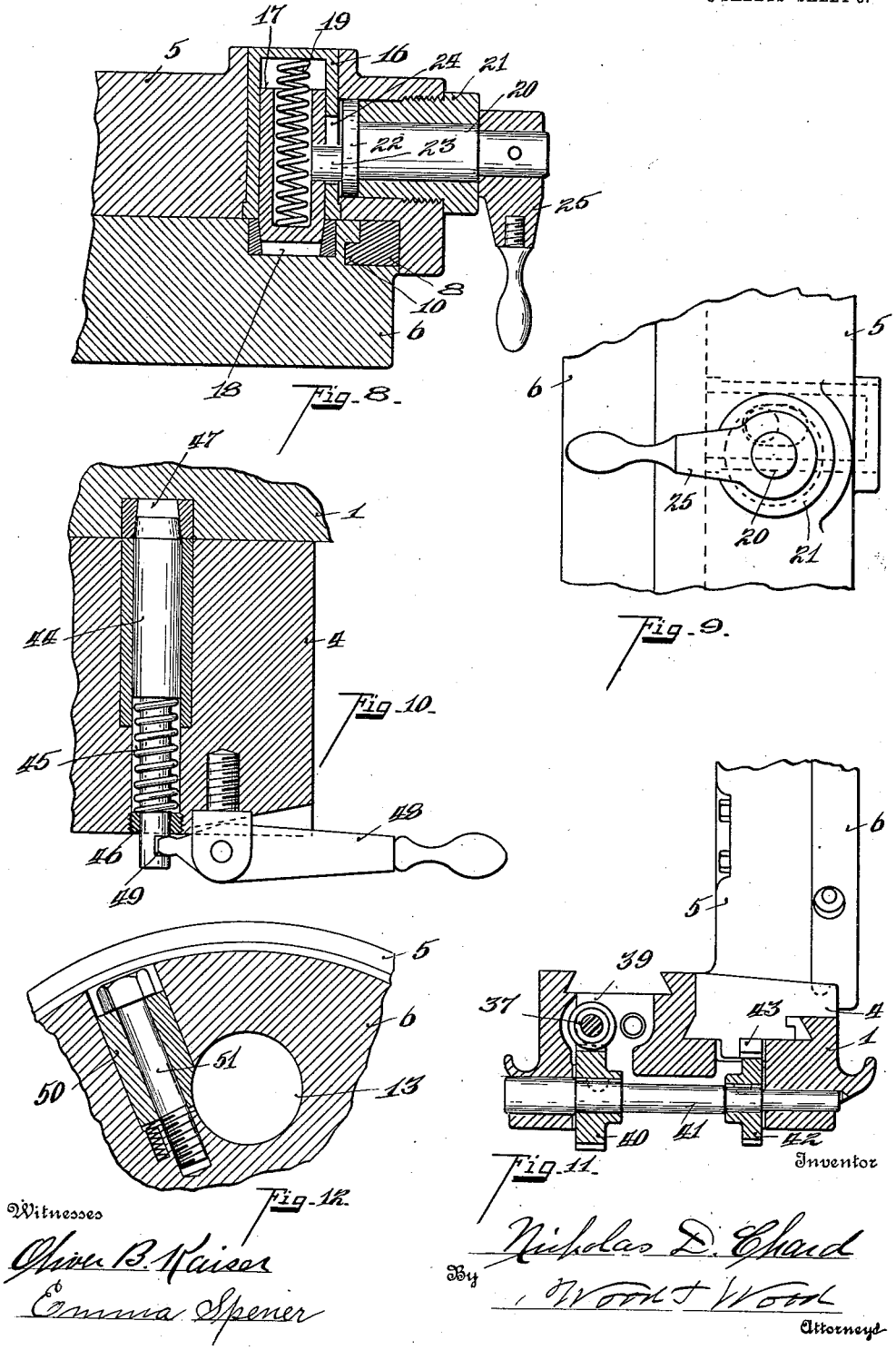

UNITED STATES PATENT OFFICE.

NICHOLAS D. CHARD, OF CINCINNATI, OHIO, ASSIGNOR TO THE LODGE & SHIPLEY MACHINE TOOL CO., OF CINCINNATI, OHIO, A CORPORATION.

LATHE.

1,007,182.   Specification of Letters Patent.   Patented Oct. 31, 1911.

Application filed September 22, 1909. Serial No. 519,026.

*To all whom it may concern:*

Be it known that I, NICHOLAS D. CHARD, a citizen of the United States, residing at Cincinnati, in the county of Hamilton and State of Ohio, have invented certain new and useful Improvements in Lathes, of which the following is a specification.

My invention relates to an improvement in engine lathes.

The object of my invention is to provide a lathe carriage with a supplemental tool-holding slide carrying a turret for holding a number of cutting tools.

Another object of my invention is to provide a lathe carriage, with a cross feed slide provided with a turret for supporting a series of cutting tools, with means for locking the turret to present a given tool in an axial line with the work, and means for locking the slide to the carriage, whereby the tools carried by the turret can be moved thereon, to axially aline the same with the lathe centers.

Another object of my invention is to provide a lathe carriage with a main and supplemental slide, said supplemental slide provided with a turret for holding a series of cutting tools with means for actuating both slides independent of each other transversely on the carriage.

Another object of my invention is to provide a carriage with a main and supplemental slide, and with a single hand wheel for independently traversing each slide upon the carriage, with a stop for automatically locking the supplemental slide in an axially alined position for tool-holders relatively to the lathe centers.

Another object of my invention is to provide an engine lathe with a turret-supporting slide for holding a series of tools with means for locking the turret in position of adjustment, and with means for automatically locating the tool and support of any one of the series, in axial alinement with the lathe centers, and with means for manually releasing the same.

The features of my invention are more fully set forth in the description of the accompanying drawings, forming a part of this specification, in which:—

Figure 1:
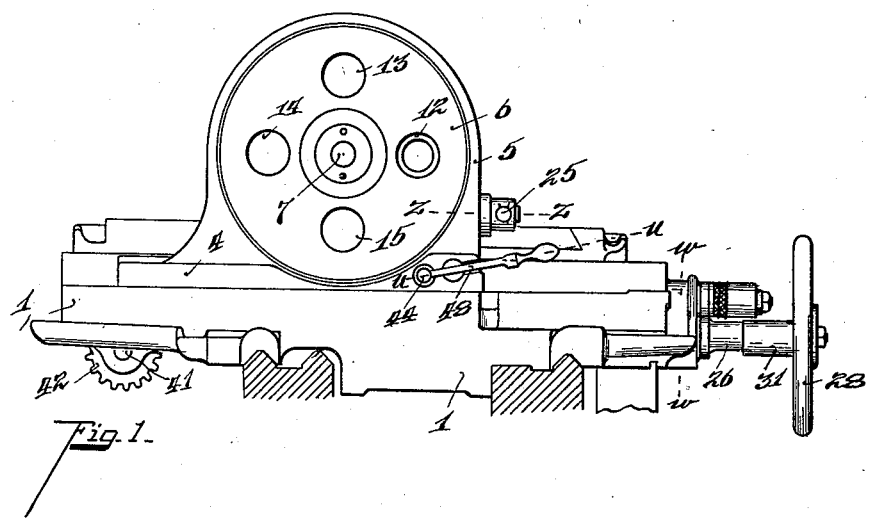
Figure 2:
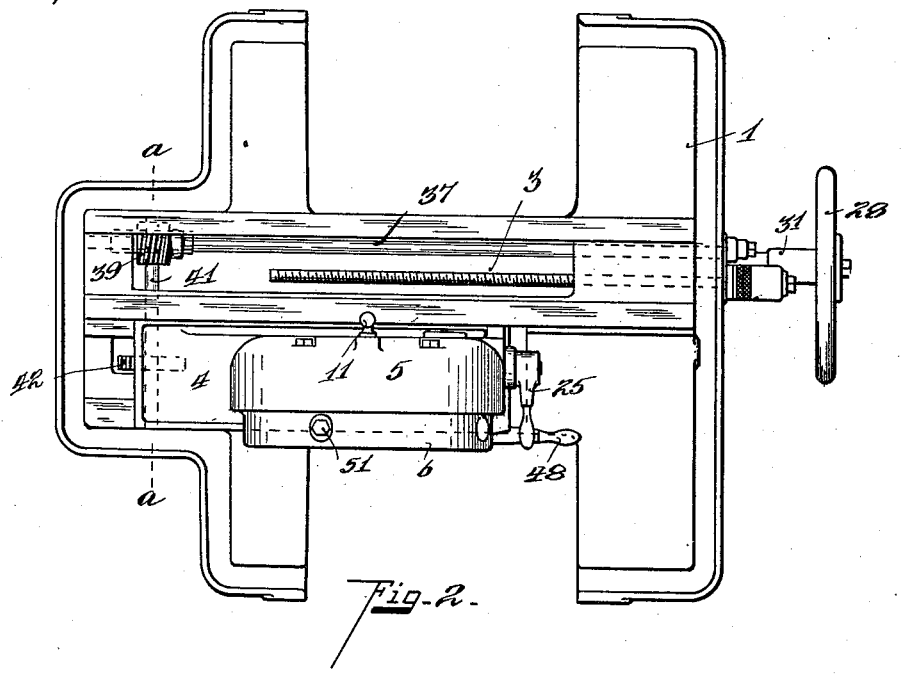

Figure 1 is a side elevation of a lathe carriage embodying my improvement. Fig. 2 is a top plan view thereof with the main slide removed. Fig. 3 is a front elevation thereof with a supplemental turret slide, illustrated in central vertical section. Fig. 4 is an enlarged detail view, illustrating the form of connection between the turret and the support. Fig. 5 is a section on line $x$, $x$, Fig. 3. Fig. 6 is an enlarged section on line $w$, $w$, Fig. 1, illustrating only the train of gearing. Fig. 7 is a section on line $y$, $y$, Fig. 6. Fig. 8 is a section on line $z$, $z$, Fig. 1. Fig. 9 is an end elevation of Fig. 8. Fig. 10 is an enlarged section on line $u$, $u$, Fig. 1. Fig. 11 is a section on line $a$, $a$, Fig. 2. Fig. 12 is a detailed section through a portion of the turret, illustrating the form for clamping the tool thereon.

This form of carriage is adapted to be used in connection with a lathe shown and described in an application to myself on even date herewith, to-wit, September 22, 1909, Serial No. 519,025, which lathe is adapted for turning a piece of work, having different diameters, with each diameter of a given width, and boring or end finishing a piece of work without removal from a chuck position within the spindle of the head stock, thereby rendering a series of operations without requiring the necessity of inserting or removing the work or cutting tools to complete the work, enabling various cutting tools to be conveniently and quickly brought to their cutting position.

1 represents the carriage, slidable upon the ways of the bed in the usual manner, and provided with the usual form of apron, carrying the feeding devices for feeding the carriage upon the bed by hand or power common in lathes.

2 represents the main tool-holding slide, transversely slidable upon the carriage in the usual manner of cross feed for a tool slide in dove-tailed ways.

3 represents the cross feed screw, engaging a nut projected from the base of the slide 2, for feeding the slide upon the carriage. This main slide being provided with means not shown for supporting one or more tool-holders.

4 represents a supplemental slide traveling in the ways upon the carriage adjacent to that of the main slide 2.

5 represents an upwardly projecting turret-support.

6 represents a tool-holding turret revolubly mounted upon the support 5 and journaled upon a stud-pin 7, carried by the support 5.

8 represents a clamping ring secured to the support by means of the bolts 9, see Fig. 3, which ring is preferably formed in sections provided with a flange 10 projecting into a circumferential groove formed on the turret 6. The uppermost section of the ring is provided with a hand screw 11, whereby the upper portion of the turret can be frictionally clamped to the support 5, to prevent vibration or quivering action of the turret upon its support.

Mounting the turret vertically upon a vertical support, having a bearing face, to receive the entire abutting surface of the turret, and with the turret adapted to be rigidly clamped against such bearing face, provides a rigid holder for a tool while in commission against any strains, at the same time maintaining the tool in axial alinement with the machine center.

The cross slide way of the carriage of a lathe must be relatively narrow as compared to the longitudinal length of the bed to give the carriage the fullest possible movements between the centers. Applicant's vertical turret organization is especially designed to meet these lathe conditions. For instance, if the ordinary turret rotatable on a horizontal base were used, the horizontal dimensions would be too great for adaptation to a carriage of a lathe. I overcome this objection by using a substantially narrow turret bearing plate projected vertically from the cross slide way of the carriage, and thus the turret occupies practically no more room than the turning tool slide, and in addition, I obtain the advantage of a vertical bearing axially alined with reference to the turret tool. Furthermore, this organization permits the turret support plate to have a counter-sunk bearing. This enables me to employ turret clamping means which engage the periphery of the turret and compress it radially toward the center, thus keeping it perfectly true and also preventing all endwise movement. The advantages of being able to do either boring or turning work on a regular lathe organization without detracting from the ordinary capacity of the lathe are very considerable. I know of no lathe, or prior patent on a lathe showing a carriage with two cross feed slides, one for a turning tool and one for a narrow vertical rotatable turret which can be either pushed out of the way when the turning is to be performed or locked into the exact center for boring work.

As illustrated in Fig. 1, the turret is preferably provided with four orifices 12, 13, 14 and 15, for supporting the various cutting tools, such as drills or the like, each of which is adapted to be brought to axial alinement with the lathe centers when the slide has been moved to its proper position upon the carriage, and, as illustrated, in Fig. 1, the orifice 12 is so alined.

It is desirable to provide means for automatically locating the tool-holding orifices or tools of the turret upon the support 5 for axial alinement relatively to the lathe centers and lock the same in such position, thus enabling a quick adjustment to proper cutting position of any one of the tools carried by the turret, and which is accomplished preferably by the following instrumentalities:—(see Figs. 1, 2, 8, and 9:) 16 represents a cup sleeve fixed within the support 5. 17 represents a hollow pin telescopically engaged within the cup sleeve 16, adapted to engage automatically into one of a series of notches 18, formed into the coincident face of the turret 6. Said hollow pin 17 is maintained under tension through the medium of a spring 19 to move the pin outward to engage with an alined notch 18, one end bearing against the closed end of the cup sleeve 16 and the opposite end projected into the hollow pin, and bearing against the same. 20 represents a stud journaled in the sleeve plug 21, fixed within a bore in the support 5, said stud 20 provided with a circumferential flange 22, engaging against the inner end of the sleeve plug 21, forming means for maintaining the stud in position. 23 represents a boss projected eccentric from the face of the flange 22, through a slot 24, in the cup-sleeve 16 and engaging into a slot formed in the side of hollow pin 17. 25 represents a hand lever fixed to the opposite end of the stud 21. Thus, by swinging the hand lever, or moving the same from horizontal to vertical position, the hollow pin can be released from engagement with a respective notch 18, in the turret, to release the turret for rotating the same to bring a second tool to its cutting position. Reversing the movement of the lever permits the hollow pin to be automatically engaged into a notch in the rotation of the turret, and locked in such position until released by the hand-lever 25.

As the turret attachment is preferably in this instance supplemental to the main tool carrying slide, it is desirable to move the same rearward out of operative position when the cutting tool or tools on the main slide are in use and is also convenient to have this shifting of the supplemental slide accomplished by the hand-wheel employed for feeding the main slide. This is accomplished by the following instrumentalities:—26 represents a bearing sleeve screw threaded into the front of the carriage 1, within which the shaft 27 is journaled carrying the hand-wheel 28, said hand-wheel being frictionally connected by means of the washers 29, and spring 30, to the sleeve 31, providing a slipping engagement between the hand-wheel 28 and shaft 27, to prevent undue pressure being exerted on the limiting stops provided in connection with the main and supplemental slides, or prevent too rapid feeding of the tools to the work, greater than the frictional clamping strain between the shaft 27 and the hand-wheel 28, preventing breakage of parts in the individual feeds of both slides. This being desirable in bringing the supplemental slide to working position, as lock mechanism is provided for automatically locking the slide to the carriage when brought to axial alinement with the lathe centers. 32 represents a gear fixed to the shaft 27, in mesh with a gear 33, forming one of a train of gears carried by the apron, for transmitting power from the feed-shaft to the cross feed screw of the main slide, when it is desired to feed the same by power. The gear 32 is also adapted to be moved into mesh with gear 34, on the screw-rod 3, for feeding the main slide either by hand or power. 36 represents a gear fixed to shaft 37, one end of said shaft journaling in a sleeve 38, screw threaded into the front of the carriage, and, as shown in Fig. 7, gear 32 is in mesh with gear 36, for actuating or moving the supplemental slide by the hand-wheel 28. The gear 32 is slid into or out of mesh with either one of the gears 34, 36, by pushing the hand-wheel 28 in or out as desired, for independently sliding or feeding either the main or supplemental slide, thus forming means for effecting a cross movement of either one of the slides by one hand-wheel. 39 represents a worm fixed to shaft 37, in mesh with a worm-wheel 40, fixed upon shaft 41, said shaft being journaled within bearings formed in the carriage 1, (see Fig. 11.) 42 represents a rack gear fixed to shaft 41, the teeth of which are in mesh with the teeth of the rack 43, fixed to the base of the supplemental slide. Thus when gear 32 is in mesh with gear 36, revolution of the hand-wheel 28 will transmit motion through shaft 27, gears 32, 36, shaft 37, worm 39, worm-wheel 40, shaft 41, and rack-gear 42, to the supplemental slide for moving the same into or out of operative position.

To provide means for automatically locating the position of axial alinement of the turret with the lathe centers I provide the following instrumentalities:—(see Fig. 10:) 44 represents a spring actuated lock-pin mounted in the supplemental slide 4, maintained under outward tension by means of the spring 45, bearing against the collar 46, screw-threaded within the slide 4, the opposite end of the spring bearing against the shoulder formed on the pin 44. 47 represents a notch formed in the carriage to receive the lock-pin when the slide is moved to axial position with the lathe centers. 48 represents a hand-lever, one end of which engages into a notch 49, formed in the pin 44, forming a loose connection between lever 48 and pin 44, for disengaging the pin from the notch 47 to release the slide.

To lock the cutting tools in position upon the turret I preferably provide a sleeve 50, slidably mounted within a bore formed in the periphery of the turret, (see Fig. 12), and transverse to the tool holding bore. Said sleeve being adapted to engage the cutting tool and frictionally clamp the same in position by tightening of the bolt 51, screw-threaded into the turret, passing through the sleeve with its head engaging the sleeve 50. It is obvious, however, that various ways may be employed for mounting the tool upon the turret without departing from the features of my invention.

Having described my invention, I claim:—

1. A lathe carriage, having a main tool-holding slide, and a supplemental turret slide, a single hand-wheel, and independent connections between said main slide and supplemental slide, whereby said hand-wheel can be shifted for alternately feeding either one of said slides, to present the tools relatively to the work.

2. A lathe carriage, having a main cross-feed tool-holding slide slidably mounted upon said carriage, means for feeding said slide, a supplemental tool-holding slide slidably mounted upon said carriage, means adapted to be thrown into operative connection with said main slide feeding means, for feeding said supplemental slide, independent of the main slide.

3. In a machine of the class described, a bed, a carriage sliding thereon, two independent transverse slide-ways on the carriage, a turning tool slide on one of said ways, means for feeding said slide, a boring tool slide on the other way, means for moving the last-named slide into and out of alinement with machine centers, and means for automatically locking said boring tool slide in position for cutting.

4. A lathe carriage formed with parallel slide-ways, a lathe tool slide and a vertical turret bearing slide respectively mounted thereon, and means for alternatively feeding said slides, whereby they cannot be operated simultaneously.

In testimony whereof, I have hereunto set my hand.

NICHOLAS D. CHARD.

Witnesses:
 OLIVER B. KAISER,
 EMMA SPENER.

Copies of this patent may be obtained for five cents each, by addressing the "Commissioner of Patents, Washington, D. C."